(No Model.)

A. WACKER.
ICE VELOCIPEDE.

No. 340,643. Patented Apr. 27, 1886.

Witnesses
W. N. N. Knight
E. G. Siggers

Inventor
Andrew Wacker
By his Attorneys
C. A. Snow & Co.

UNITED STATES PATENT OFFICE.

ANDREW WACKER, OF KINGSTON, NEW YORK.

ICE-VELOCIPEDE.

SPECIFICATION forming part of Letters Patent No. 340,643, dated April 27, 1886.

Application filed February 13, 1886. Serial No. 191,856. (No model.)

*To all whom it may concern:*

Be it known that I, ANDREW WACKER, a citizen of the United States, residing at Kingston, in the county of Ulster and State of New York, have invented a new and useful Improvement in Ice-Vehicles, of which the following is a specification, reference being had to the accompanying drawings.

My invention relates to improvements in vehicles adapted for use upon the ice, and the novelty consists in the construction, arrangement, and combination of the several parts substantially as hereinafter described, and specifically pointed out in the claims.

Figure 2:
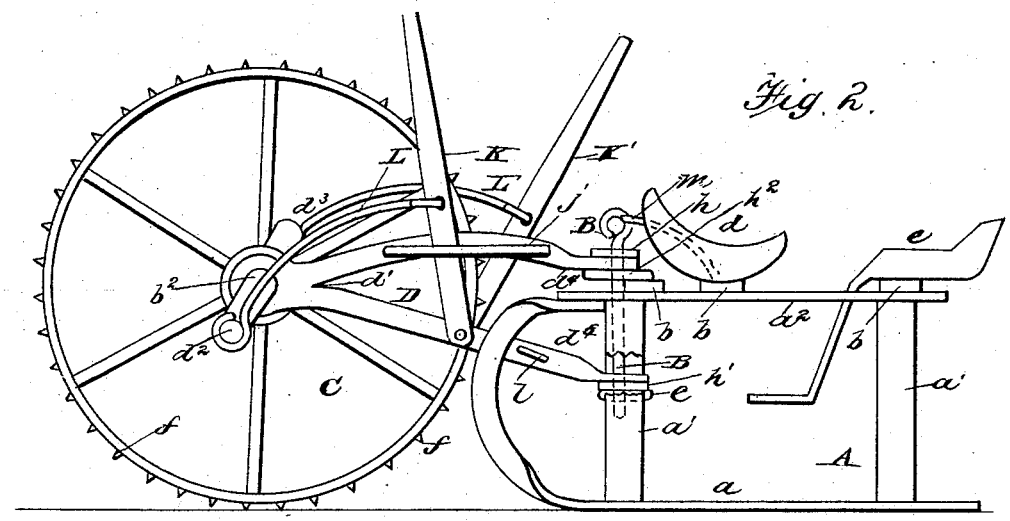
Figure 1:
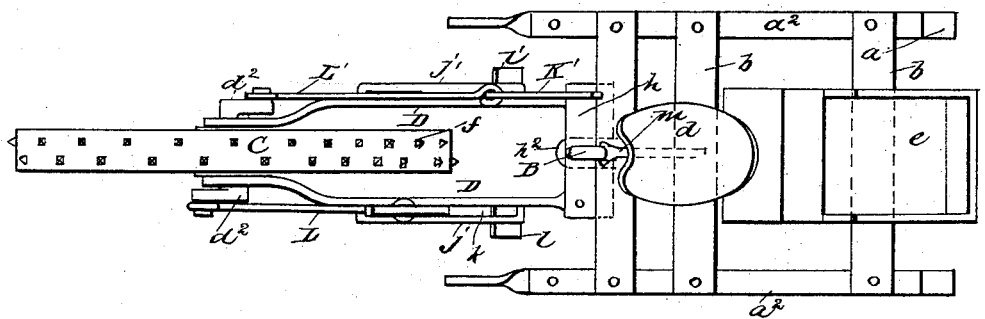
Figure 3:
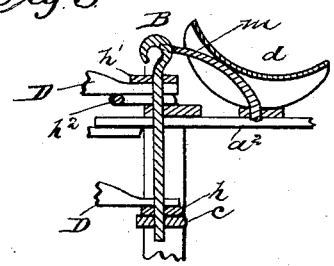

In the drawings, Figure 1 represents a top plan view of an ice-vehicle embodying my invention. Fig. 2 is a side elevation thereof. Fig. 3 is a longitudinal section through the vehicle-body and bolt securing said body to the driving-wheel.

Referring to the drawings, in which similar letters of reference denote similar parts, A designates the vehicle-body, consisting in runners or shoes $a$, preferably of metal, connected by standards $a'$ with longitudinal side rails, $a^2$.

$b$ designates transverse rails that extend from one to the other of the rails $a^2$.

$c$ designates transverse rails extending below the rails or bars $b$, between the standards $a'$, to brace the same, and also to provide at the forward end of the vehicle-body a support for the lower end of the king-bolt B, that secures the vehicle-body A to its propelling or driving wheel C, as hereinafter described.

$d$ designates a saddle, secured upon the upper surface of the middle transverse rail $b$, equidistant from the ends thereof.

$e$ designates a seat, secured to the rear transverse rail $b$ at its middle to accommodate persons other than the driver of the vehicle.

The vehicle is propelled by a wheel, C, having a series of spurs, $f$, surrounding and projecting from its periphery.

D D' designate the draw-bars, by which the wheel C is connected to the body A. Said bars are bifurcated from points $d'$ near their forward ends rearward, are placed at each side of the wheel, and pivoted or hinged to said wheel by a shaft, $b^2$, that passes through apertures formed in the forward end of each of said bars D D', and into and through the wheel-hub, and terminates at each end in cranks $d^2$ $d^3$. The rear bifurcated ends, $d^4$ $d^5$, of each of the bars D D' are separated in the vertical plane. The upper and lower ends of the one, D, is connected by plates $h$ $h'$ with the upper and lower ends of the other, D'. The plates $h$ $h'$ are apertured at their middles to receive the king-bolt B, that passes through the upper plate, $h$, to and through a forwardly-projecting staple, $h^2$, thence to and through the lower plate, $h'$, and forward transverse rail, $c$, below which it may be secured, if desired.

$j$ $j'$ designate short bars that extend at one side, the outer of each of the arms $d^4$ of the bars D D', parallel with and a short distance therefrom. Each of the bars $j$ $j'$ is bent laterally at its ends, and is connected at said ends with the arms $d^4$ of the draw-bars D D'.

K K' designate levers that pass through the space $k$ between the parts $d^4$ and bars $j$ $j'$ at each side of the machine to, and are pivoted to the lower draw-bar arms, $d^5$, at $d^6$.

L designates connecting-rods that extend from the levers K K' to the cranks $d^2$ $d^3$ at each side of the machine.

$l$ $l'$ designate projecting foot-rests from the lower arms, $d^5$, of the draw-bars D D'.

$m$ designates a leaf-spring or a spring-rod, the forward end of which is bifurcated and bears against the upper end of the king-bolt B, while the opposite lower end of said rod extends below the saddle $d$, and is secured to the middle transverse rail $b$.

The operation of my improvement is as follows: A person seated upon the saddle $d$ places his feet upon the foot-rests $l$ $l'$, and grasps the handles of the levers K K', by operating which levers the vehicle may be propelled with great rapidity over the ice. By pressing either of the foot-rests $l$ $l'$ the wheel C may be swung to either side, as desired. The body A and wheel C may be detached from each other, if desired, the former operating as a sled or sleigh.

I claim—

1. The combination of the sled-frame, a driving-wheel having the cranks, the draw-bars loosely connected at one end to the shaft of the driving-wheel, the king-bolt connecting the draw-bars and sled-frame, the operating handles or levers carried by the draw-bars, and links intermediate of the operating-handles and the cranks of the driving-wheel, substantially as described, for the purpose set forth.

2. The combination of the sled-frame, the driving-wheel having the cranks, the bifurcated draw-bars arranged on opposite sides of the driving-wheel and having one of their ends loosely connected to the shaft thereof, the transverse plates connecting the rear ends of the arms of the bifurcated draw-bars, the king-bolt pivotally connecting the plates and the sled-frame together, the pivoted levers carried by the draw-bars, and links intermediate of the levers and the cranks of the driving-wheel, substantially as described.

3. The combination of the sled-frame, a driving-wheel having the cranks, the draw-bars arranged on opposite sides of the driving-wheel and loosely connected at one end to the shaft thereof, said draw-bars being bifurcated to provide the upper and lower arms, $d^4$ $d^5$, the transverse plates $h\,h'$, connecting the free ends of the draw-bar arms, a staple, $h^2$, secured to the sled-frame, a king-bolt passing through the transverse plates and the staple and sled frame to pivotally connect the same together, the operating-levers pivoted on the draw-bars, the guides $j\,j'$ for said levers, carried by the draw-bars, the links intermediate of the levers and cranks of the drive-wheel, and the foot-pieces $l\,l'$, carried by the arms $d^5$ of the draw-bars, substantially as described.

4. In a vehicle adapted to be used upon ice, the combination of a driving-wheel, provided upon its periphery with spurs and at its center with cranks, with draw-bars D D', levers K K', connecting-rods L, king-bolt B, leaf-spring $m$, and body A of the vehicle.

5. In an ice-vehicle, a body, A, having a spring-rod, $m$, adapted to bear against a king-bolt, B, thereby causing a wheel, C, connected by draw-bars D D' to said king-bolt to bear with greater or less force upon the ice, as and for the purpose set forth and described.

In testimony that I claim the foregoing as my own I have hereto affixed my signature in presence of two witnesses.

ANDREW WACKER.

Witnesses:
REUBEN BERNARD,
JOHN WACKER.